(12) United States Patent
Jolley

(10) Patent No.: US 9,688,881 B1
(45) Date of Patent: Jun. 27, 2017

(54) LOW-MELT POLYAMIC ACID BASED POWDER COATINGS

(71) Applicant: The United States of America as Represented by the Administrator of the National Aeronautics and Space Administration, Washington, DC (US)

(72) Inventor: Scott T. Jolley, Titusville, FL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 371 days.

(21) Appl. No.: 14/199,975

(22) Filed: Mar. 6, 2014

Related U.S. Application Data

(60) Provisional application No. 61/773,416, filed on Mar. 6, 2013.

(51) Int. Cl.
*C09D 179/08* (2006.01)
(52) U.S. Cl.
CPC .................................. *C09D 179/08* (2013.01)
(58) Field of Classification Search
CPC .................................................... C09D 179/08
See application file for complete search history.

(56) References Cited

U.S. PATENT DOCUMENTS

| 3,872,040 | A | * | 3/1975 | Mollohan | ............... | C09D 5/033 |
| | | | | | | 427/375 |
| 5,229,458 | A | * | 7/1993 | Schimmel | ............... | C09D 5/037 |
| | | | | | | 525/108 |
| 8,623,253 | B2 | | 1/2014 | Jolley | | |
| 2011/0212334 | A1 | * | 9/2011 | Jolley | ..................... | B29C 73/02 |
| | | | | | | 428/458 |

FOREIGN PATENT DOCUMENTS

CA          1075846        *    4/1980

* cited by examiner

*Primary Examiner* — Xiao Zhao
(74) *Attorney, Agent, or Firm* — Michelle L. Ford.; Jennifer P. Yancy

(57) ABSTRACT

The present invention is directed to a method for powder coating a metal substrate using a low-melt polyamic acid (PAA) polymer that readily imidizes to polyimides. These low-melt PAAs have been shown to be useful in resins applied as powder coatings to metal surfaces. The resin includes an end-capping material capable of providing crosslinking functionality to at least one end of the low-melt PAA polymer. The end-capping material functions dually as a polymerization chain terminator and crosslinking agent, thus producing resins that have molecular weights low enough to flow well and form good cured films applicable for use in powder coating.

14 Claims, No Drawings

LOW-MELT POLYAMIC ACID BASED POWDER COATINGS

CROSS-REFERENCE TO RELATED APPLICATIONS

This application claims the benefit, under 35 U.S.C. 119(e), of U.S. Provisional Application No. 61/773,416 filed Mar. 6, 2013, the contents of which are incorporated herein by reference.

ORIGIN OF THE INVENTION

The invention described herein was made in the performance of work under a NASA contract and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

BACKGROUND OF THE INVENTION

1. Field of the Invention

The present invention relates to powder coatings formed from low-melt polyamic acids (PAAs) and method for coating a substrate using said low-melt PAAs for the formation of polyimide coatings.

2. Description of Related Art

A significant portion of the infrastructure assembled at the John F. Kennedy Space Center (KSC) and other NASA sites over the past 40+ years is subject to outside weathering effects. As much of this infrastructure consists of metallic surfaces, a considerable amount of effort is continually expended to develop methods to minimize or eliminate the effects of corrosion on these surfaces. This is especially prevalent at KSC where the effects of off-shore salt spray and solid rocket booster (SRB) exhaust greatly enhance corrosion rates. Coatings of various types have traditionally been the choice for minimizing corrosion. Improved corrosion control methods are constantly being researched. Current coating technology minimizes the degradation process but fails to provide complete, long-lasting protection. Coating manufacturers are continually searching for new techniques and formulations that provide increased corrosion protection for metallic surfaces and other systems.

One coating method currently utilized is the method of powder coating. Powder coating can be used to provide a wide variety of coatings to metallic surfaces. These powder coatings are, in many cases, an improvement over traditional liquid based coatings with respect to oxidation/corrosion protection, while providing the distinct advantage of being more environmentally friendly. Powder coatings are still, however, permeable over time to water vapor and eventually fail in their ability to provide needed protection.

Over the past 20-30 years coatings applied via powder versus those applied in a liquid form have gained usage because of their environmental acceptance, cost/application, and increased corrosion resistance. Draw backs to this coating method include high powder spray apparatus costs and traditionally limited surfaces (e.g., metal) that can be coated via powder. Resin types have also been limited for use in powder coatings due to those which will melt and flow in the time required to cure these coatings. Thus materials based on high performance resins such as nylons, fluorocarbons, polyimides, etc. have not found favor in this area.

Powder coatings have been used throughout the industry to paint a myriad of metallic objects. The conventional method of powder coating has gained popularity because of its conservation of materials and elimination of environmentally unfriendly volatile organic compounds (VOCs). In industry, powder coatings are prepared from three basic resin types: polyesters, acrylics, and epoxies. The basic resins are very low in molecular weight (500 to 2000) and have melting points around 80-100° C. Their melt viscosities are also quite low. These resins are chosen because they melt and flow into a smooth coating before curing to a durable surface. A typical formulation consists of the resin, a flow and leveling aid, a degassing aid, pigment, and a cross-linking agent, if necessary. These ingredients are mixed as powders and are then run through an extruder at a temperature high enough to melt the ingredients. These ingredients are well mixed as a melt during the extrusion process. The melt is cooled and resulting flake is ground and sieved to give a powder of about 10-100 microns in size. This powder is applied to the intended metallic surface via a fluidized bed spray gun. The gun is either equipped with a linear tribo-charging chamber or a corona field that applies a charge to the dry powder, allowing it to adhere to the metal target. The coated piece is then placed in an oven where the powder melts, flows, and hardens into a final coating Other types of resins that have demonstrated excellent protection properties have failed to be adapted for use in powder coatings for a variety of reasons that include high cost, poor solvency, and high working temperatures. High-performance resins such as Teflon®, nylon, polyimide, etc. have not been utilized in creating powder coatings because of their relatively high melting points.

Polyimides are but one example of high-performance resins that have been used in certain applications such as wire insulation. This type of coating has to be applied as a film wrap because of the difficulty encountered in working with the polymer. Were a method found that would allow this resin (or other high-performance resin) to function as a powder coating or be applied as a liquid coating, the resultant product would be considered a significant advancement over current materials.

Recent work at KSC in the area of developing an improved method for the repair of polyimide, such as Kapton®, based electrical wire insulation has resulted in the identification of polyimides that have much lower melting points than traditional polyimides used for insulation purposes. Based on these lower melting points and the many other outstanding physical properties of polyimides, such as thermal stability, chemical resistance, and electrical properties, the question arose as to the applicability of this type of resin for use in powder coatings.

Polyimides are typically prepared by reacting equal molar amounts of two starting materials: a dianhydride and a diamine. These molecules react alternately with one another when mixed until a polymer with a molecular weight of several hundred thousand is produced. Such a polymer, by itself, is too high in molecular weight to function well as a powder coating. The polymers produced are generally in the molecular weight range of 150,000 to 250,000. Commercial polyimides such as Kapton® do not have melting points, but rather decompose at a very high temperature (>400° C.). However, the reaction to prepare polyimides goes through an intermediate polymer known as a PAA.

One of the outstanding features of polyimide is its high-temperature properties. Polyimide is a plastic that cannot be processed or extruded using typical industry techniques. This plastic is not dissolvable in typical solvents. It can only be rolled into films or machined into shapes. PAA precursors are soluble in some organic solvents, allowing this precursor to be cast as a thin film, which can then be heat cured into the final polyimide.

As will be described in detail, high-performance polyimide polymers can essentially be used as thin films. The extremely high melting points and chemical insolubility of these materials have thus far limited the use of these polyimide materials.

Polyimide resins are often brittle when applied as a coating onto a metallic surface. They have a high melting point or no melting point, so they tend to not flow at moderate temperatures to evenly coat an object. Polyimides and many other high-performance polymers have outstanding physical properties. So, most of them have the potential to function as high-performance coatings. Indeed, polyimides have found use as copper wire enamel that coats wire used in electrical motor windings, solenoids, and the like. Most often, however, these types of high-performance polymers are limited in their use as coatings because of their brittleness, poor solubility, and/or high melting points.

BRIEF SUMMARY OF THE INVENTION

Polyimide coatings may be prepared by first synthesizing a low-melt polyamic acid (PAA) polymer. This low-melt PAA polymer is heated to a temperature that transforms the PAA polymer through imidization into a polyimide. PAA polymers themselves do not have the physical properties that polyimides exhibit. But PAA polymers do tend to have lower softening/melting temperatures than polyimides. The present invention is directed to the preparation of PAA polymers with significantly lower melting/softening temperatures than polyimides.

The present invention is directed to a method for powder coating a substrate using low-melt PAA polymers that readily imidize to polyimides. These low-melt PAAs have been shown to be useful in powder coating resins which can be applied to metal surfaces. Low-melt PAA polymers having an average molecular weight of below 50,000, more preferably below 20,000, are needed for the powder resin to exhibit the needed melt and flow properties necessary to produce good powder coatings. But, such low molecular weight polymers formed from equal molar amounts of dianhydride and polyamines are often too brittle to use as an effective powder coating. Therefore, in one embodiment of the present invention, the low-melt PAA polymer has non-equal molar amounts of the dianhydride and polyamine in the polymer chain, and preferably there is a higher level of either the polyamine or the dianhydride. Additionally, it is preferred that the resin includes an end-capping material capable of providing cross-linking functionality to at least one end of the low-melt PAA polymer. The end-capping material functions as a polymerization chain terminator and thus produces resins that have molecular weights low enough to flow well and form good films applicable for use in powder coating. In one embodiment, the addition of maleic anhydride to provide at least one maleimide type end cap has provided at least two advantages to the resin. First, the low-melt PAA polymer coating gels or stiffens into a hard durable coating upon melt/cure. Second, the low-melt PAA polymer coating resists cracking/crazing better upon bend testing. When curing, such low molecular weight, low-melt PAA polymer resins containing reactive end caps can crosslink, forming higher molecular weight polyimide coatings which can eliminate brittleness associated with lower molecular weight polymers.

The present invention is directed to the use of low-melt PAA polymers in the powder resin used in formulating a powder coating. These powder resins, including the low-melt PAA polymers, when sprayed onto metal surfaces, may then be cured in conventional powder coating ovens to yield high-performance polyimide coatings which offer superior heat and electrical stability as well as superior chemical resistance over known powder coatings.

The present invention provides the ability to coat large metal surfaces with thin polyimide films, resulting in superior protection from oxidation and corrosion. The present invention further provides a method of producing unique powder coatings that overcome the problems associated with previous materials.

DETAILED DESCRIPTION OF THE INVENTION

Low-melt polyamic acid (PAA) polymers are formed by the condensation polymerization of at least one low crystallinity dianhydride and at least one aliphatic polyamine, wherein the amine groups are all primary amines (also referred to herein as "primary aliphatic polyamine"). This condensation polymerization first generates a low-melt PAA polymer as an intermediate. This low-melt PAA intermediate is isolated as a solid resin and is used as the material blended with other additives and "melt mixed" to get a powder resin for application to a metal substrate. Preferably, the powder resin has a diameter of about 10-100 microns in size. The powder resin including the low-melt PAA polymer is applied to a substrate and subjected to temperatures that will cure the low-melt PAA intermediate to a high performance polyimide that is intimately bonded to the substrate.

In order to overcome previous problems relating to PAA polymers for use in powder coating, it was discovered that low-melt PAA polymers can be prepared by reacting at least one low crystallinity dianhydride with at least one primary aliphatic polyamine in the presence of an end-capping material capable of providing cross-linking functionality to at least one end of the low-melt PAA polymer. This cross-linking functionality to at least one end of the low-melt PAA polymer provides a cross-linkable polyimide that has the ability, at low temperatures, to melt, flow and adhere to a substrate. In another embodiment, at least one low crystallinity dianhydride and at least one primary aliphatic polyamine are provided in non-equal molar amounts such that there is more amine present than anhydride in the resulting low-melt PAA.

Low crystallinity dianhydrides can also be classified as complex molecules which have significant molecular complexity and higher molecular weights. These low crystallinity dianhydrides often have melting points significantly lower than the traditional dianhydrides used in the preparation of commercial polyimides. In one embodiment of this invention, only complex, low crystallinity dianhydrides with melting points below 200° C. are provided as the low crystallinity dianhydride material. In a preferred embodiment, the low crystallinity dianhydride is one or both of the following dianhydrides.

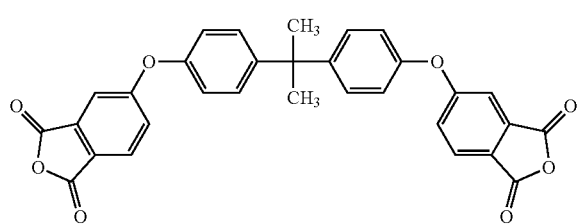

Bisphenol A dianhydride
BPADA

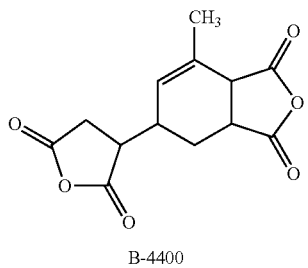

B-4400

The present invention includes only primary aliphatic polyamines as the amine portion of the PAA resins. Such primary aliphatic polyamines are found within the group consisting of only carbon, hydrogen and nitrogen, with no unsaturated linkages in the molecule. Among, but not limited to, such primary aliphatic polyamines are the family of linear aliphatic α, Ω-diamines such as ethylene diamine, 1,6-hexanediamine, 1,12-dodecanediamine (DAD), and the like. Also in this family are any primary cyclic diamines such as 1,4-cyclohexyldiamine. A number of branched aliphatic primary polyamines are included such as 2-methylpentane diamine (also refererd to herein as Dytek® A). Also included are other polyamines such as tris(2-aminoethyl) amine. In a preferred embodiment, the only primary aliphatic polyamine present in the low-melt PAA polymer is selected from the following primary aliphatic polyamines.

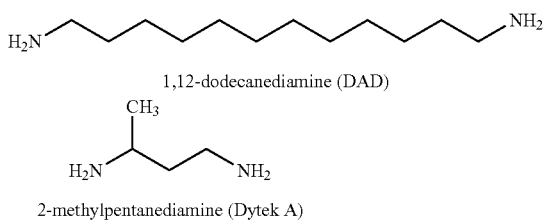

In yet another embodiment, only BPADA and/or B-4400 are provided as the only low crystallinity dianhydride(s) with only DAD as the only primary aliphatic polyamine. Furthermore, only maleic anhydride is added to this embodiment as the end-capping material.

PAAs containing siloxane or polyether diamine chemistry provide good low melt resins but do not produce acceptable coatings. Therefore, PAAs having siloxane or polyether chemistry are not included with the list of acceptable low-melt PAAs for powder coating application. Polyether diamines provided in the polyamide acid produce a coating that is too soft and susceptible to delamination. Therefore, Applicant expressly excludes polyether amines from the polyamines used in the present invention.

The low-melt PAA polymer provided in the powder coating includes an end-capping material capable of providing cross-linking functionality to at least one end of the low-melt PAA polymer. The end-capping material functions as a polymerization chain terminator during the PAA formation step and thus produces low-melt PAA polymers that have molecular weights low enough to flow well and form good films applicable for use in powder coatings. In one embodiment, the low-melt PAA polymer includes an end-capping material capable of providing cross-linking functionality to two ends of the low-melt PAA polymer. In another embodiment, the low-melt PAA polymer includes the addition of maleic anhydride as the end-capping material to provide one or more maleimide type end-caps. The cross-linkable low-melt PAA polymers in accordance with the present invention have the ability, at low temperatures, to melt, flow, and adhere (e.g., bond) to a substrate. These low-melt PAAs can then, under increased heat, undergo cross-linking which assists in the bonding of the polyimide to the substrate surface. One embodiment of the present invention uses maleic anhydride as an end-capping material that allows the low-melt PAA polymer to retain its fluidity at elevated temperatures. In order for a low-melt PAA polymer or polyimide to be an effective powder coating, after being applied to the substrate it must melt, flow, and adhere well even when heated. This ensures intimate, permanent contact between the polyimide and the substrate surface. The applied heat should preferably then cure the powder coating to a cross-linked polyimide material with a much higher melting or softening point. It has been found that this low-melt PAA polymer including the use of maleic anhydride to provide end-capping of the PAA polymer chain has unexpected advantages. The reactive groups that are formed on the PAA polymer chain react when cured to form high molecular weight, high melt-point polyimide coatings. Other end-capping materials having an olefinic nature that are capable of providing cross-linking functionality to at least one end of the low-melt PAA polymer may be used including, but are not limited to, acrylic acid, methacrylic acid, allyl alcohol, allyl amine, and vinyl amine. It is important that the crosslinking process occurs after the initial melting and flowing of the coating. Cross-linking end groups can be incorporated into both low-melt PAA polymers and polyimides. End-capping material such as maleic anhydride can function as chain termination molecules and produce resins that will form good films. During the cure process a low-melt, low molecular weight PAA, end capped with maleic anhydride, can cross-link through the olefin group of the end-cap. Such crosslinking increases the molecular weight of the final coating, and the resulting coating has improved flexibility compared to polyimide coatings without the presence of reactive end cap groups. Such crosslinked coatings do not delaminate or crack when the metal substrate is bent and have good scratch resistance and toughness. Because of the "dual" nature of reactivity of maleic anhydride, two important needs can be met in the development of usable polyimide coatings. The present invention limits the polymers molecular weight to enable good melt flow and then allows the resin to gain its molecular weight which builds toughness and flexibility into the film.

Therefore, the present invention is directed to a method for powder coating a metal substrate comprising, a) providing a metal substrate; b) powder coating directly onto said metal substrate a layer of powder resin including at least one first low-melt PAA polymer, wherein said at least one first low-melt PAA polymer is formed by reacting at least one low crystallinity dianhydride with at least one primary aliphatic polyamine in the presence of an end-capping material capable of providing cross-linking functionality to at least one end of the low-melt PAA polymer; and c) heating the layer of powder resin to a temperature to effectively melt and then cross-link the PAA polymer to form a high-melt polyimide coating on the metal substrate.

In one embodiment, the powder resin includes a mixture of two PAA polymers. In one embodiment wherein the powder resin includes a mixture of two PAA polymers the powder resin further includes at least one second low-melt PAA polymer, wherein said at least one second low-melt PAA polymer is formed by reacting at least one dianhydride with at least one polyamine formed without any end-capping material. In one embodiment, the at least one second low-melt PAA polymer is formed by reacting at least one low crystallinity dianhydride with at least one primary aliphatic polyamine formed without any end-capping material.

In one embodiment, the powder resin in accordance with the present invention includes more than 50% by weight of the first low-melt PAA polymer. Alternatively, the powder resin may include at least 80% by weight of the first low-melt PAA polymer.

Further included with the invention are articles of manufacture including the polyimide polymer coating provided herein.

In one embodiment, the present invention is directed to a method for powder coating a metal substrate comprising, a) providing a metal substrate; b) powder coating directly onto said metal substrate a layer of powder resin including at least one first low-melt PAA polymer, wherein said at least one first low-melt PAA polymer is formed by reacting a low crystallinity dianhydride and a primary aliphatic polyamine along with at least one equivalent of maleic anhydride end-capping material in a polymerization reaction mixture to form a low-melt PAA polymer; wherein the low crystallinity dianhydride is one of the following dianhydrides:

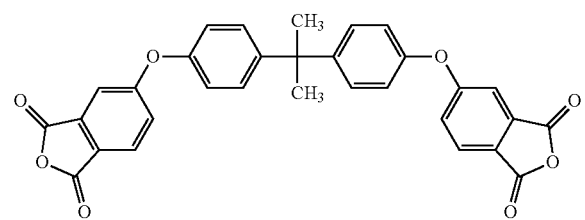

Bisphenol A dianhydride
BPADA

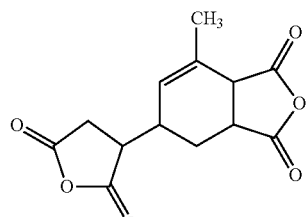

B-4400 and the primary aliphatic polyamine is one of the following diamines:

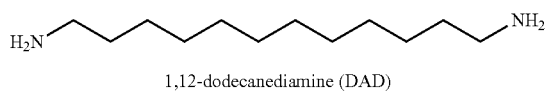

1,12-dodecanediamine (DAD)

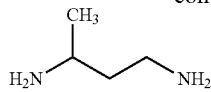

2-methylpentanediamine (Dytek A)

and heating the layer of powder resin to a temperature to effectively melt and then cross-link the PAA polymer to form a high-melt polyimide coating on the metal substrate.

In a preferred embodiment one of the two reaction methods may be employed in the preparation of these low-melt PAA polymers. The method used may involve the addition of the low crystallinity dianhydride, in one portion, to a stirring solution of the primary aliphatic polyamine in a solvent such as N-Methylpyrrolidinone (NMP). Once the bulk of the reaction of the two starting materials (i.e. the polyamine and the dianhydride) was complete, the end-capping material may be added. Alternately, the low crystallinity dianhydride and the end-capping material were added at the same time. Preferably, at least 50% by weight of reactants in the polymerization reaction mixture are a polyamine or dianhydride, such as BPADA, B-4400 and DAD, forming the low-melt PAA polymer.

The powder resin including the low-melt PAA polymer may include a variety of additives. One such additive provided in the powder resin are various flow modifiers such as sorbitan monopalmitate, Disparlon® PL-545, Crayvallac® MT, or other similar material used by those familiar with this art. In a preferred embodiment, 0-10% by weight of the powder resin includes flow modifiers. In one embodiment, about 5-10% by weight of the powder resin is a "traditional" polyester or epoxy coating resin is supplied as an additive to the powder resin. These additives aid in reducing pin holes and increasing soak adhesion.

The term "low-melt" polymer as used herein refers to a polymer that melts or flows at a low enough temperature to be useful for powder coatings. Preferably, the low-melt PAA polymer has a melting point below 150° C., preferably 75-110° C. A "high-melt" polymer has a melting temperature higher than the corresponding low-melt polymer. Most preferably, it has a melting temperature above 300° C. or no melting temperature (i.e. as the temperature is raised it decomposes rather than melts). In other embodiments, it may have a melting temperature above 200° C. or above 250° C.

Preferably, the low-melt polymer has an average molecular weight below 50,000, more preferably below 20,000, wherein the low-melt polymer is a polyimide or PAA.

In one embodiment, the low-melt PAA polymer is a mixture of two or more PAA polymers mixed together to achieve the necessary melting/softening temperature. In this regard, the melting temperature of the resulting mixture is significantly lower than the melting point of the highest melting polymer component and often, due to melting point depression laws, lower than the melting temperature of both polymer components or all polymer components of the mixture. The two PAA polymers chosen as components in the mixture are blended by mixing individual fluids containing the component PAA polymers or by mixing the individual solid PAA polymers with a given amount of suitable solvent such as NMP. The newly created mixture is stirred at room temperature until all of the polymer has dissolved. This polymer solution can then be used to cast polymer films or to be processed to isolate the solid polymer mixture. In one embodiment, the PAA resin mixture is formed by a process comprising: dissolving the at least two PAA polymers into a compatible solvent to form a PAA solution; and evaporating at least some of the solvent to form a solidified resin mixture.

The embodiments of the invention will now be illustrated by the following non-limiting examples. The examples are intended to illustrate the invention but not limit its scope.

EXAMPLES

Low-melt PAA polymers evaluated as powder coatings may be prepared by precipitating the solid polymer from NMP or Dimethylformamide (DMF) solution. This can be done by pouring the PAA solution into rapidly stirring water and then collecting and drying the solid polymer. The PAA is evaluated as a powder coating by mixing it with other additives (flow and leveling aids, pigments, etc.) and then heated to the melting point of the resin. The molten mixture is then mixed to homogenize the mixture. This new PAA resin mixture is then ground into a resin powder suitable for application via traditional powder coating spraying techniques.

It has been determined that some PAAs have melting points low enough that it is possible to prepare the polymer in a form that can be applied to metal surfaces, heated to induce melting, and cured to the final polyimide. Low-melt PAAs are prepared by reacting low crystallinity dianhydride and primary aliphatic polyamine monomers together in a solvent such as NMP. Solid, powdered PAA adaptable for use in powder coatings can be obtained by isolating the polymer from the solvent solution by pouring the reaction mixture into water and collecting the solid precipitated polymer. The polymer can then be dried and ground to the proper particle size.

Powdered PAA can also be obtained by preparing an aqueous ammonium salt solution of the polymer and blending the solution with a light hydrocarbon and surfactant at a high speed to produce an emulsion. The water present in the emulsion can be removed and the resultant PAA powder is collected from the hydrocarbon phase by filtration. It may be possible to "paint" a metallic surface with the emulsion, allowing the liquid phase to evaporate, leaving behind a film of PAA which would then be heated to induce melting, flow, and then cured into a final polyimide film.

A number of physical properties need to be met for a low-melt PAA polymer resin to function as a good powder coating material. These include:
  Low melting point (~75-110° C.);
  Low melt viscosity (depends greatly on the molecular weight of the resin);
  Good wetting of substrate surface;
  Strong adhesion to metallic substrates;
  Some flexibility; and
  Moderate hardness.

Example 1

A resin powder coating that will deliver improved corrosion control is desired. Therefore, it is preferred to select diamines that minimize the ability of the resin powder coating to associate with water vapor. The diamine selected in this case was DAD. Most of the low-melt polymer materials developed for wire insulation repairs, as disclosed in U.S. Pat. No. 8,623,253, are resin based on equal-molar amounts of BPADA/DAD, have melting points somewhat above the criteria required for powder resins and also have relatively high melt viscosities. To overcome these shortcomings, the present invention is directed to providing non-equal molar amounts of dianhydride and polyamine. The present example specifically aims to include dianhydride:diamine ratios from the midpoint of 1:1 to 2:1 (or 1:2). Low-melt PAAs including non-equal molar amounts of the dianhydride and diamine have lower molecular weights which reduce the melt viscosity and perhaps the melting point of the resins. Table 1 lists the ratios of various BPADA/DAD polymers and the melting points and molecular weights (MW) associated with a particular ratio.

TABLE 1

| Anhydride/ Amine ratio (m) | Melting point ° C. | GPC MW |
| --- | --- | --- |
| 2:1 | 110 | 15,000 |
| 3:2 | 95 | 63,000 |
| 1:1 | 100 | 175,000 |
| 2:3 | 130 | 180,000 |
| 1:2 | 50 | 85,000 |

As can be seen from this data the amount of amine present in the resin correlates with an increase in melting point until a maximum is reached, after which the melting point drops rapidly to a near liquid state at room temperature. Although a general trend indicates that melting points are higher with higher molecular weights and lower with lower molecular weights this correlation is harder to make when any individual polymer versus its molecular weight is examined.

Example 2

Typical laboratory evaluations of powder coatings employ the use of a bench scale extruder and a small powder spray booth. To minimize the number of low crystallinity dianhydride and primary aliphatic diamine starting materials being evaluated some modifications to this usual evaluation process were developed. Coating formulations for initial evaluation were dry mixed on a one to two gram scale in small glass vials. In place of extrusion, the contents of these small glass vials were heated via heat gun to melt the ingredients. They were then hand stirred to homogenize the ingredients. This process proved difficult for some resins as their melt viscosity was very high. Complete homogenization of resins and additives was sometimes problematic. The synthesis of polyimide resins with low molecular weights is very difficult (see Table 2). Even with the incorporation of end-capping material and other well-known techniques molecular weights are significantly higher for polyimide resins than for other powder resins. Three very important coating properties needed to be addressed for each experimental formulation. These properties were observed to vary widely from formulation to formulation during the coating process. These three properties are as follows: 1) coating wetting; 2) coating flexibility; and 3) coating adhesion.

Wetting and flexibility were identified as critical properties during this work. Adhesion was thought to be a non-issue as standard pull testing showed that some polyimide formulations exhibited good "dry" adherence to steel and aluminum panels. Salt fog testing, however, revealed that these same formulations exhibited rather quick delamination from steel panels.

Example 3

Testing to determine polyimide coating adhesion via long term soak testing proved to be necessary. Steel coupons coated with candidate polyimide formulations were rated subjectively on the above three categories as well as a fourth category of film smoothness and appearance (e.g., flow and leveling). Ratings were as follows for each category:

F—Flexibility, 90° Bend (0 to 5 Scale)
 0—Coating shatters and falls from coupon upon bending
 1—Coating shatters and falls from coupon at bend point
 2—Coating cracks badly, can be removed using moderate force
 3—Coating crazes heavily, cannot be removed using moderate force
 4—Some cracks appear upon bending
 5—No cracking occurs upon bending A—Soak Test Adhesion, 5% Salt Solution (0 to 5 Scale)
 0—Coating delaminates quickly upon immersion in water (<8 hrs)
 1—Coating delaminates completely by 24 hrs.
 2—Partial delamination after 24 hrs, complete delamination in 48 hrs.
 3—Partial delamination after 48 hrs, complete delamination after 1 week
 4—Slight delamination after 1 week
 5—No delamination after 1 week W—Wetting (0 to 5 Scale)
 0—Poor coverage, >50% cratering/bare metal surface
 1—Many large craters (>1 mm diameter)
 2—Many medium to small craters (<1 mm)
 3—Moderate number of small craters/pin holes (20 to 50)
 4—<20 craters/pin holes
 5—No craters/pin holes S—Flow & Leveling (0 to 5 Scale)
 0—Extreme wrinkle/surface unevenness
 1—Very poor melt flow
 2—Poor melt flow
 3—Better melt flow but surface still irregular
 4—Slight wrinkle/orange peel
 5—Coating smooth, uniform and glossy In one example of this testing, the following building blocks for polyimides were evaluated:

Dianhydrides:

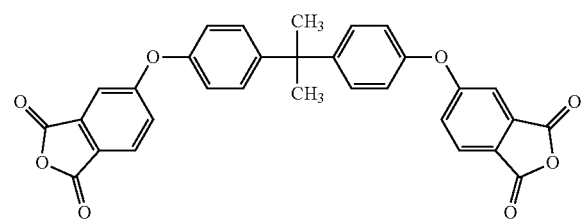

Bisphenol A dianhydride
BPADA

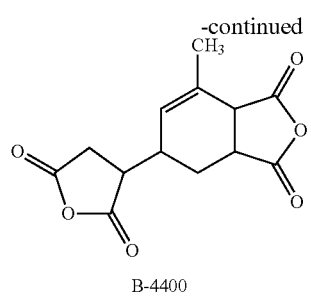

B-4400

Diamines

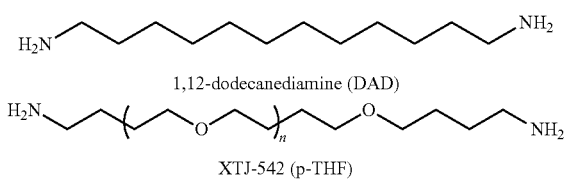

1,12-dodecanediamine (DAD)

XTJ-542 (p-THF)

While polyether diamines, such as XTJ-542, are not included within the scope of the present invention. The following results have been included merely to show its poor performance and its unsuitability as a powder coating. A flow and leveling aid of 3% sorbitol monopalmitate was also added. This formulation gave excellent flexibility, flow and leveling, and good wetting. Salt fog testing revealed, however, that this formulation has poor adhesion. The category rating scale for this formulation would be as follows: F-5, A-2, W-4, S-5.

Adhesion

Soak test adhesion testing of polyimide based powder coatings proved necessary to determine formulations which might stand up to tough environmental conditions. Soak testing in the laboratory was accomplished by simply immersing the coated coupon in a beaker of 3% salt solution and observing the progress of delamination and corrosion over time. In order to compare experimental polyimide formulations with other types of powder coatings three commercial powder coating resins were obtained from DuPont®. The commercial resins obtained were a clear coat epoxy, a clear polyester, and a white hybrid (mixed epoxy/polyester). Table 2 lists a few of the more important polyimide resin formulations that have been soak tested and the resulting adhesion rating obtained from this screen test.

TABLE 2

| Item | Formulation | Rating | Comments |
|---|---|---|---|
| 1 | Dupont ® Clear Epoxy | 3.5 | |
| 2 | Dupont ® Clear Polyester | 3 | |
| 3 | Dupont ® White Hybrid | 3 | |
| 4 | B4400/DAD/MAA (4:5:2)m; SMP | 2 | Salt fog testing, best wetting |
| 5 | BPADA/DAD (1:1)m | 3.5 | |
| 6 | BPADA/DAD (1:2)m | 2.5 | Wrinkle finish |
| 7 | BPADA/DAD (2:3)m | 3 | " |
| 8 | BPADA/DAD (9:10)m | 3 | " |
| 9 | BPADA/DAD (3:2)m | 3 | Anhydride termination |
| 10 | BPADA/DAD (3:2)m | 4 | Carboxy termination |
| 11 | BPADA/DAD (8:7)m | 5 | Delamination begin >14 days |

TABLE 2-continued

| Item | Formulation | Rating | Comments |
|---|---|---|---|
| 12 | BPADA/DAD (12:11)m | 4.5 | Delamination begins ~1 wk |
| 13 | B4400/DAD (8:7)m | 4 | |
| 14 | BPADA/DAD/MAA (1:1:1)m | 4.5 | |
| 15 | BPADA/DAD/MAA (4:4:1)m | 4.5 | Improved Flexibility |
| 16 | BPADA/DAD/XTJ-542 (8:6:1)m | 5 | Small Blisters |
| 17 | DAD/MAA (1:2)m | 1 | |
| 18 | 10/15/DER 661/PL 545 (8:1:0.7:0.3)w | 5 | "Formula 1" |
| 19 | 10/15/PL 545 (9:0.7:0.3)w | 5 | "Formular 2"; all polyimide |
| 20 | 14/Uralac 1590/PL 545 (9.2:0.5:0.3)w | 4.5 | "Formular 3"; no MAA |

SMP - sorbitan monopalmitate; DER 661 - low molecular weight epoxy resin
PL 545 - Flow and leveling aid, mix of low molecular weight acrylate polymer and modified castor waxy amide
w - % by weight
Uralac 1590 - Hydroxy terminated polyester resin As can be seen from those tests listed in this table, the three baseline powder formulations evaluated in this test delaminate fairly quickly with the epoxy resin being best of these. This information is in line with industry knowledge showing that epoxy type resins have the best salt fog corrosion performance among commercial powder coatings. As various polyimide resins were evaluated in this test it was soon noticed that candidates which have carboxy functional termination perform best in the soak test. Items 9 and 10 represent the same resin with the difference being that item 10, during reaction workup, was soaked in water for a time long enough to hydrolyze the terminal anhydride groups to a dicarboxylic acid end group.

Anhydride vs. dicarboxylic acid termination

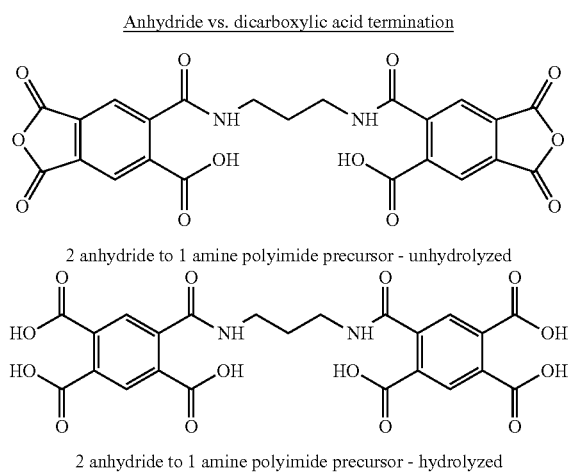

2 anhydride to 1 amine polyimide precursor - unhydrolyzed 2 anhydride to 1 amine polyimide precursor - hydrolyzed Amine functional end groups result in poorer soak test results. Maleic anhydride (MAA) end capping also results in poor soak test results. Item 17, a molecule prepared by reacting DAD with 2 equivalents of MAA, represents a very low molecular weight, low viscosity reactive diluent and cross-linker that has proven very important in generating flexibility with these polyimide powder resins. This material has very poor soak test results by itself and unfortunately lowers the test results obtained when added to any other polyimide powder formulation. Items 18-20 represent the three polyimide formulations evaluated in full scale salt fog testing; where the first components of the formulation (designated by number only) are other sample formulation item numbers from Table 2.

Substrate Wetting

It was determined in early testing that polyimides show reduced metal surface wetting when employed as a powder coating. The use of sorbitan monopalmitate (SMP) as a flow and leveling agent was identified and allowed the creation of Item 4, Table 2 as a formulation that significantly reduced the number of small craters/pin holes after coating cure. Each panel prepared from this formulation had ~5-10 of these imperfections. Salt fog testing revealed that these imperfections were the focal point for the beginning of corrosion. Coupled with the presence of these small craters was this resin's quick delamination from the panel. This resulted in a very poor performance in the 1000 hour salt fog corrosion testing. Given these results one of the main focuses of this testing became the improvement of metal surface wetting. A large number of molecules were evaluated as additives that might minimize or eliminate cratering. These additives included a number of different surfactants and other materials that are used to increase wetting. The material found to function best was purchased as a flow and leveling aid for powder coatings and consists of a mixture of a low molecular weight polybutylacrylate polymer and a modified castor oil amide wax. This material has a trade name of Disparlon® PL-545. As seen in comparison, the application of resin 11 (Table 2) by itself resulted in a film with very poor surface setting. The addition of PL-545 gave a far superior film although still not completely wetted by the coating. Around 8-10 small craters were still present. Even better in film formation was the including of resin 17 at 10% by weight. This changes the color of the clear coating to a gold color.

Flexibility

Lower molecular weight polyimide resins, which have lower melt viscosities, have much higher crystallinity. Films prepared from these resins would fracture or crack when the coated metal was bent. An acceptable powder coating resin needs to have enough flexibility to not crack or fracture when a test piece is bent. During the process of developing a powder coating resin with a low enough viscosity to melt and flow well, one technique employed was the use of monoanhydrides to stop and "end cap" a growing polymer chain. One of these "end caps" employed was MAA. Resins that were prepared using this end capping agent were found to exhibit excellent flexibility. Higher molecular weight resins yield coatings with more flexibility, but they are almost impossible to use because of their poor melt/flow properties. Resins employing very flexible building blocks such as polyether amines (i.e., XTJ-542 included in the diamines structure above) have been shown to generate coatings with acceptable flexibility but exhibit poor film characteristics (Item 16, Table 2).

Polyimide Resin Molecular Weight

Significant effort went into the preparation of polyimide resins with low melt viscosities. This goal is most easily achieved by the preparation of low molecular weight oligomers (polymers just a few units in length). The lowest molecular weight oligomer possible in the BPADA/DAD resin system would be three units long and would consist of either two BPADA units with a center DAD unit or two DAD units and one BPADA. The theoretical molecular weight of this three unit oligomer with two BPADA units would be 1240. An attempt to prepare this oligomer resulted in a material with good melt flow but had a measured molecular weight of 14,600 via gel permeation chromatography (GPC) analysis. This is not surprising as the monomers continue to strongly condense because nothing is present to prevent a three unit oligomer from further reacting with other unreacted monomers in solution. Thus a wide range of molecular weight species are formed. The molecular weights of a number of polyimide resins are compiled in Table 3. As can be seen when monomers are present in a 1:1 molar ratio molecular weights are high, well over 300,000 for item 1. Molecular weights are reduced significantly when ratios are altered. Even item 10 has a significantly lower molecular weight than a 1:1 ratio polymer. In most cases it appears that polymers using B4400 generate materials that have slightly higher molecular weights than those prepared using BPADA. Items 6-10 represent different preparations of the same polymer. As was expected running this reaction at a higher temperature resulted in a slightly lower molecular weight product. The data in item 12 is somewhat suspect as the melt viscosity of this product is very good. This may be due to the high percentage of low molecular weight components in the polymer composition. This observation provides excellent guidance in that the presence of a high proportion of lower molecular weight PAA mixed with a higher molecular weight PAA will result in a final resin with good melt/flow properties. Based on the GPC data of item 16 it would be expected that item 12 would have a moderately lower molecular weight than 16 as the "end capping" concentration is twice as high. Attempts to prepare films from resins such as #1 result in coatings that do not flow well enough to deliver acceptable smoothness and coverage. It has been observed that resin molecular weights much above 50,000 begin to show poor flow and leveling. Melt mixing these higher molecular weight resins is also very difficult. Resin 11 is very difficult to hand melt mix and even resins 6-10 are somewhat difficult.

TABLE 3

| | | GPC Molecular Weights (p-MMA standard, NMP solvent) | | | | | | |
|---|---|---|---|---|---|---|---|---|
| # | Resin | MW 1 | % | MW 2 | % | MW 3 | % | Comments |
| 1 | BPADA/DAD (1:1)m | 317,000 | 77 | 167,000 | 19 | 77,000 | 4 | |
| 2 | BPADA/DAD (2:1)m | 14,600 | 100 | | | | | |
| 3 | BPADA/DAD (1:2)m | — | | — | | — | | Insoluble in NMP |
| 4 | BPADA/DAD (3:2)m | 29,000 | 47 | 16,100 | 49 | 7,300 | 4 | |
| 5 | BPADA/DAD (2:3)m | — | | — | | — | | Insoluble in NMP |
| 6 | BPADA/DAD (8:7)m | 52,000 | 96 | 12,200 | 4 | | | Formula 1 resin |
| 7 | " | 46,500 | 96 | 11,000 | 4 | | | |
| 8 | " | 42,400 | 92 | 13,000 | 5 | 5,800 | 3 | Larger batch |
| 9 | " | 31,400 | 89 | 9,300 | 7 | 4,500 | 4 | High temp. reaction |
| 10 | BPADA/DAD (12:11) | 46,000 | 93 | 10,700 | 7 | | | |
| 11 | B4400/DAD (8:7)m | 111,000 | 95 | 19,200 | 2 | 8,300 | 3 | |
| 12 | B4400/DAD/MAA (4:5:2)m | 107,000 | 54 | 66,000 | 20 | <15,000 | 26 | Excellent melt flow |
| 13 | BPADA/DAD/MAA (1:2:2)m | 67,000 | 64 | 27,800 | 18 | 4,200 | 18 | |
| 14 | BPADA/DAD/MAA (1:1:1)m | 43,200 | 36 | 21,700 | 48 | 5,500 | 15 | |
| 15 | B4400/DAD/MAA (1:1:1)m | 39,300 | 51 | 19,000 | 10 | 3,000 | 39 | |
| 16 | BPADA/DAD/MAA (4:4:1)m | 70,000 | 33 | 33,600 | 56 | 8,000 | 10 | |

Overall Formulation Comparisons

Table 4 lists the complete steel coupon ratings for the items listed in Table 2. As can be seen, items 18-20 represent the three formulations that were selected for 1000 hour salt fog chamber testing. They represent a formulation that is all "polyimide" (Formula 2), a hybrid polyimide/epoxy coating (Formula 1), and a hybrid polyimide/polyester combination (Formula 3). Each of these three experimental powder coatings give good flexibility, smooth glossy films, and ≥7 days of no delamination in soak teasing. Each formula scored at least a 4.5 on wetting, having exhibited only several small pin hole defects after baking. In general formulations based on polyimide resins containing BPADA performed better than those based on B-4400. Item 16 and several other formulations tested which included XTJ-542 gave films with good flow and leveling but poor soak test results. All three commercial powder formulations gave excellent flexibility, wetting, and flow/leveling results in laboratory testing. They were, however, easily bested by some polyimide formulations in soak test adhesion. As can be seen, any formulation that includes MAA endcapping on both ends of the polymer chain (i.e., items 4, 17) deliver coatings with excellent flexibility. These formulations are unfortunately some of the worst performers in salt bath soak testing. Having such endcapping on one end of the polymer chain only results in improved but not adequate flexibility (i.e., items 14, 15). The inclusion of this "end capping" as an additive or co-resin (e.g., use of item 17 in formulas 18 and 19) at a 7% level improved coating flexibility and had only minimal detrimental effects on salt bath soak performance. Comparisons between items 5 and 11, items 11 and 12, and items 14 and 15 clearly point out the coating flexibility improvement with increased resin molecular weight. Item 5, the maximum molecular weight one could expect in this system does not, however, deliver a coating with acceptable flexibility. Inclusion of very low melt viscosity materials such as item 17, DER 661 epoxy resin, or Uralac 1590 polyester resin seem to aid in melt/flow and wetting.

conical mandrel test apparatus. The test method describes two types of measurements, crack resistance and elongation. For crack resistance, the lever on the apparatus is moved 180 degrees in approximately 1 second to simulate use conditions. The resistance to cracking value is reported as the diameter at which cracking ceased. For the elongation test, the lever is moved 180 degrees more slowly, for approximately 15 seconds. The elongation is computed using the measured distance from the farthest end of the crack to the small end of the mandrel. Table 5 shows the thickness of each coating on the panels tested, along with the results using the crack resistance test for the coatings on steel and aluminum Q panels.

TABLE 4

Complete Film Ratings

| | | Ratings | | | | |
|---|---|---|---|---|---|---|
| Item | Formulation | F | A | W | S | Comments |
| 1 | Dupont Clear Epoxy | 5 | 3.5 | 5 | 4.5 | |
| 2 | Dupont Clear Polyester | 5 | 3 | 5 | 4.5 | |
| 3 | Dupont White Hybrid | 5 | 3 | 5 | 4.5 | |
| 4 | B4400/DAD/MAA (4:5:2)m; SMP | 5 | 2 | 4.5 | 4.5 | Salt fog, best wetting |
| 5 | BPADA/DAD (1:1)m | 4 | 3.5 | 3 | 2 | |
| 6 | BPADA/DAD (1:2)m | 5 | 2.5 | 4 | 1 | Wrinkled finish |
| 7 | BPADA/DAD (2:3)m | 5 | 3 | 4 | 2 | " |
| 8 | BPADA/DAD (9:10)m | — | 3 | 3 | 4 | " |
| 9 | BPADA/DAD (3:2)m | 3 | 3 | 3 | 5 | Anhydride termination |
| 10 | BPADA/DAD (3:2)m | 3 | 4 | 3 | 5 | Carboxy termination |
| 11 | BPADA/DAD (8:7)m | 3 | 5 | 3 | 5 | Delamination begins >14 days |
| 12 | BPADA/DAD (12:11)m | 3.5 | 4.5 | 3 | 5 | Delamination begins ~1 wk |
| 13 | B4400/DAD (8:7)m | 4 | 4 | 4 | 4 | |
| 14 | BPADA/DAD/MAA (1:1:1)m | 3.5 | 4.5 | 3 | 4 | |
| 15 | BPADA/DAD/MAA (4:4:1)m | 4.5 | 4.5 | 3 | 4 | Improved flexibiity |
| 16 | BPADA/DAD/XTJ-542 (8:6:1)m | 3 | 5 | 3 | 5 | Small blisters |
| 17 | DAD/MAA (1:2)m | 5 | 1 | 4 | 5 | |
| 18 | 10/17/DER 661/PL 545 (8:1:0.7:0.3)w | 5 | 5 | 4.5 | 5 | Formula 1 |
| 19 | 10/17/PL545 (9:0.7:0.3)w | 5 | 5 | 4.5 | 5 | Formula 2: all polyimide |
| 20 | 13/Uralac 1590/PL 545 (9.2:0.5:0.3)w | 5 | 4.5 | 4.5 | 5 | Formula 3; no MAA |

Physical Property Testing

Physical property testing in four different areas was carried out on steel and aluminum panels coated with the three industry baselines and the three experimental polyimide formulations. These four areas were:

1. Flexibility;
2. Dry film adhesion;
3. Abrasion resistance; and
4. Salt fog Corrosion resistance Flexibility The mandrel bend test for coating flexibility was conducted using ASTM D 522-93a, *Standard Test Methods for mandrel Bend Test of Attached Organic Coatings*, as a guideline. Test method A was employed which utilizes the

TABLE 5

Crack resistance for coatings

| | Coating Thickness (mils) | Crack Resistance |
|---|---|---|
| Clear Epoxy on steel | 1.06 | No cracks |
| Clear Polyester on steel | 1.25 | No cracks |
| White Hybrid on steel | 1.49 | No cracks |
| Formula 1 on steel | 1.20 | No cracks |
| Formula 2 on steel | 1.15 | No cracks |
| Formula 3 on steel | 1.45 | No cracks |
| Clear Epoxy on aluminum | 1.30 | No cracks |
| Clear Polyester on aluminum | 1.50 | No cracks |
| White Hybrid on aluminum | 0.96 | No cracks |
| Formula 1 on aluminum | 1.25 | No cracks |
| Formula 2 on aluminum | 1.72 | No cracks |
| Formula 3 on aluminum | 1.99 | 5" (the entire length) |

Since no cracks were evident for the crack resistance test on all the steel panels, it is presumable that the elongation test would also have produced no cracks. Less cracking would be expected when the lever is moved more slowly. Therefore, the coatings on steel all would have an elongation percent greater than 32.

The aluminum Q panels also showed no cracks during the conical bend test, except for Formula 3. The Formula 3 coating cracked the entire length of the panel, 5 inches. Since Formula 3 on aluminum performed differently than the rest, a second panel was used to do the elongation test (15 seconds to move the lever). The panel cracked more in the area where the diameter was thicker than in the area where the diameter for the bend was smaller. The sample used for the elongation study had a coating thickness of 1.28 mils. Since the coating cracked the entire length of the panel, the elongation would be less than 4%.

This testing shows that Formula 1 and Formula 2 performed as well as the commercially available powder coatings. Formula 3 performed similarly when the substrate was steel.

Dry Film Adhesion

The pull-off strength of three commercially available coatings along with three experimental powder coatings was tested using ASTM D 4541-02, *Standard Method for Pull-Off Strength of Coatings Using Portable Adhesion Testers*. A self-alignment adhesion tester type IV (Patti 110 model) was used. There are three planes of potential failure during a pull-off strength test in this type of study. The first plane is the interface between the metal panel and the coating. The second plane is between the coating and the adhesive. The adhesive used was a two part quick drying epoxy. The third plane is between the adhesive and the pull "dolly" which is glued to the coating.

Table 6 gives the average results for two trials per coated panel. The majority of trials did not have any coating removal from the metal substrate. In all pull tests the interface with the glue and the dolly remained intact. Testing of Formula 3 resulted in failures of both dollies between the metal and coating layer on both aluminum and steel. The average pull-off tensile strength for the Formula 3 steel coated sample was 600 psi. This indicates that the glue adhesion to this formulation was much better than the adhesion to any other coating, including the industry standards. Formula 2 on an aluminum panel had one pull test separation at the substrate/coating interface. All other coatings on steel or aluminum had glue failures at the coating/adhesive interface before reaching a pressure that would separate the coating from the substrate. Formula 3 on aluminum had failure between the coating and the metal substrate at 308 psi. Only the white hybrid coating reached a higher pressure before glue failure at 343 psi. Therefore, the observation can be made that Formula 3 does not adhere as well to aluminum as the white hybrid coating.

In summary, the pull-off adhesion values for the coating/metal interface for most of these coatings could not be determined as the glue did not adhere very well to the powder coatings, causing the glue/coating interface to be the point of failure. The data for Formula 3 are, however, valid as these pull values represent substrate/coating failures. For the other coatings all that can be stated is that the pull-off adhesion for the metal/coating interface for most of the coatings would be greater than the values shown in Table 6.

TABLE 6

Results of ASTM 4541-02

| Sample | Substrate | Average Pull-Off Tensile Strength, psi | Comment |
| --- | --- | --- | --- |
| Formula 1 | Steel | 483 | No coating removal, glue failure |
| Formula 1 | Al | 187 | No coating removal, glue failure |
| Formula 2 | Steel | 141 | No coating removal, glue failure |
| Formula 2 | Al | 169 | ~8% coating removal on one sample |
| Formula 3 | Steel | 600 | ~20% average coating removal |
| Formula 3 | Al | 308 | ~20% average coating removal |
| White Hybrid | Steel | 365 | No coating removal, glue failure |
| White Hybrid | Al | 343 | No coating removal, glue failure |
| Clear epoxy | Steel | 475 | No coating removal, glue failure |
| Clear epoxy | Al | 187 | No coating removal, glue failure |
| Cleary polyester | Steel | 117 | No coating removal, glue failure |
| Clear polyester | Al | 74 | No coating removal, glue failure |

Abrasion Resistance

The abrasion resistance of these coatings was evaluated via the Taber resistance test following ASTM D 4060-07. The abrasive wheel used was a CS-17. The wheel was resurfaced with an␣5-11 abrasive disk after 500 cycles. There are three ways this method is used to express abrasion resistance, (1) the wear index, (2) weight loss, and (3) wear cycles per mil of coating. The wear index, I, is calculated using the following equation:

$$I=[(A-B)*1000]/C$$

Where A and B are the initial and final weights of the test specimen respectively, and C is the number of cycles taken until bare metal is observed on the specimen due to the abrasion. A small weight loss and many cycles would be ideal. Therefore, the smaller the number the better. The weight loss, L, is simply the different in the initial and final weight of the specimen.

$$L=A-B$$

The wear cycles per mil, W, is calculated using the following formula:

$$W=C/T$$

Were T is the initial thickness of the coating. The more cycles needed to show bare metal, the better. When comparing wear cycles, a larger value is better.

Two samples of each coating system were tested. Table 7 shows the average initial starting thickness for the coatings in the study. The initial thickness of the white hybrid, clear epoxy, Formula 1, and Formula 3 were close to 1 mil. The initial thickness of the clear polyester and Formula 2 is a little larger.

TABLE 7

Average initial coating thickness

| Coating | Average Thickness, mils |
| --- | --- |
| White Hybrid | 1.06 |
| Clear Epoxy | 0.97 |
| Clear Polyester | 1.38 |
| Formula 1 | 1.00 |
| Formula 2 | 1.58 |
| Formula 3 | 0.92 |

Table 8 shows the abrasion resistance testing results for the coatings tested in this study.

TABLE 8

Abrasion Measurements

| Coating | Wear Index (I) | Weight Loss, mg (L) | Wear Cycles Per Mil |
|---|---|---|---|
| White Hybrid | 85 | 42 | 474 |
| Clear Epoxy | 35 | 27 | 802 |
| Clear Polyester | 47 | 45 | 699 |
| Formula 1 | 50 | 16 | 330 |
| Formula 2 | 56 | 43 | 490 |
| Formula 3 | 81 | 10 | 135 |
| Early PI | 18 | 31 | — |

The polyimide from Example 2 performed the best among the seven coatings tested. Formula 1 had a similar wear index to the clear polyester. Formula 3 had the worst value for wear cycles per mil. Polyimide coatings from Table 2 seem to fall generally within the range of normal powder coating performance on abrasion. The significantly better performance of the polyimide coating (Early PI) in the early polyimide testing may be explained by the presence of the MAA end capping groups on both ends of the molecules comprising this resin. The cross-linking that occurs within the resin would be much more significant than in the polyimide formulations provided in Table 2. This cross-linking could account for the "tougher" nature of this resin.

Salt Fog Corrosion

The three commercially available powder coatings (clear epoxy, clear polyester, and white hybrid of polyester and epoxy) and the three polyimide based powder coatings (Formula 1, Formula 2, and Formula 3) were coated onto steel and aluminum Q panels. The stock number for the steel Q panels was R-35, and the aluminum panels were 3003H. Four panels of both steel and aluminum for each of the six coating systems were placed into a salt fog chamber and programmed to perform the ASTM B117 test procedure. Essentially, the panels are placed in a chamber and exposed to a 5% sodium chloride fog for 1000 hours at 35° C.

Upon removal from the chamber, the amount of corrosion evident on the steel panels was evaluated using the ASTM D610 rating procedure. Table 9 shows the descriptions for the rust ratings using this ASTM standard method. The rust rating is an indication of the percent of the metal surface under the coating that has rusted.

TABLE 9

Rust Grade for Corroded Steel

| Rust Grade | Percent of Surface Rusted |
|---|---|
| 10 | <0.01% |
| 9 | >0.01% and ≤0.03% |
| 8 | >0.03% and ≤0.1% |
| 7 | >0.1% and ≤0.3% |
| 6 | >0.3% and ≤1.0% |
| 5 | >1.0% and ≤3.0% |
| 4 | >3.0% and ≤10.0% |
| 3 | >10.0% and ≤16.0% |
| 2 | >16.0% and ≤33.0% |
| 1 | >33.0% and ≤50.0% |
| 0 | >50% |

A letter after the rust grade designates the type of rust evident. An "S" is used if it is spot rusting, i.e., the bulk of the rusting is concentrated in a few localized areas. A "G" is used for general rusting, i.e., various sizes of rust are randomly distributed over the area. A "P" is used for pinpoint rusting, i.e., the rust is distributed as tiny individual specs across the surface. An "H" is for hybrid rusting, i.e., there is a mixture S, G, and/or P.

Next, the tape was removed from the top of the panel, and a razor was utilized to determine how much the film delaminates from the metal surface by sliding a sharp object between the panel and the coating.

Table 10 shows the rust rating for the steel panels along with comments describing the results obtained upon using a razor blade lifting technique at the edge of each panel to test for delamination. The best rust rating for the steel panels occurred for the white hybrid coating, all of which showed no signs of rust for the area exposed. There were rust stains which dripped down the front of the panel from uncoated areas, but there was no rust development where the coating was applied. The clear epoxy had two panels with a rating of 10, while the other two had small spots of corrosion evident. Formula 1 performed the third best of the six coatings tested, followed by Formula 2. The clear polyester and Formula 3 both have the lowest rating possible. Both corroded over more than 50% of the surface.

TABLE 10

Evaluation of panels after salt fog exposure

| Sample Name | Substrate | ASTM Rating (Steel) | Delamination comments |
|---|---|---|---|
| Clear Epoxy #3 | Steel | 10 | Coating peels off from edges with ease in large strips |
| Clear Epoxy #4 | Steel | 10 | Coating peels off from edges with ease in large strips |
| Clear Epoxy #5 | Steel | 8S | Coating peels off from edges with ease in large strips |
| Clear Epoxy #6 | Steel | 9S | Coating peels off from edges with ease in large strips |
| Clear Polyester #1 | Steel | 0 | Coating peels off from edges with ease in large strips |
| Clear Polyester #2 | Steel | 0 | Coating peels off from edges with ease in large strips |
| Clear Polyester #3 | Steel | 0 | Coating peels off from edges with ease in large strips |
| Clear Polyester #4 | Steel | 0 | Coating peels off from edges with ease in large strips |
| White hybrid #3 | Steel | 10 | Coating peels from edges, but stops between ¼ to 1 inch. Then it is more difficult to get the coating off. |

TABLE 10-continued

Evaluation of panels after salt fog exposure

| Sample Name | Substrate | ASTM Rating (Steel) | Delamination comments |
|---|---|---|---|
| White hybrid #4 | Steel | 10 | Coating peels off from edges, but stops around ½ inch. Then it is more difficult to get the coating off. |
| White hybrid #5 | Steel | 10 | Coating peels off from edges, but stops between ¼ to ½ inch. Then it is more difficult to get the coating off |
| White Hybrid #6 | Steel | 10 | Coating peels off from edges, but stops between ¼ to 1 inch. Then it is more difficult to get the coating off |
| Formula 1 #1 | Steel | 6S | Coating peels off from edges with ease in large strips |
| Formula 1 #4 | Steel | 4S | Coating peels off from edges with ease in large strips |
| Formula 1 #5 | Steel | 5S | Coating peels off from edges with ease in large strips |
| Formula 1 #6 | Steel | 4S | Coating peels off from edges with ease in large strips |
| Formula 2 #1 | Steel | 4G | Coating peels off rom edges with ease in large strips. However, there are small areas of good adhesion |
| Formula 2 #3 | Steel | 4G | Coating peels off rom edges with ease in large strips. However, there are small areas of good adhesion |
| Formula 2 #5 | Steel | 3G | Coating peels off rom edges with ease in large strips. However, there are small areas of good adhesion |
| Formula 2 #6 | Steel | 3G | Coating peels off rom edges with ease in large strips. However, there are small areas of good adhesion |
| Formula 3 #2 | Steel | 0 | Coating peels off from edges, but not in large sheets. The film tears before large sheets can form. |
| Formula 3 #3 | Steel | 0 | Coating peels off from edges, but not in large sheets. The film tears before large sheets can form. |
| Formula 3 #5 | Steel | 0 | Coating peels off from edges, but not in large sheets. The film tears before large sheets can form. |
| Formula 3 #6 | Steel | 0 | Coating peels off from edges, but not in large sheets. The film tears before large sheets can form. |
| Clear Epoxy #1 | Aluminum | | Coating did not delaminate |
| Clear Epoxy #2 | Aluminum | | Coating did not delaminate |
| Clear Epoxy #3 | Aluminum | | 1/16 of an inch delaminated |
| Clear Epoxy #4 | Aluminum | | Coating did not easily delaminate. Between 0 and ¼ of an inch could be shipped off with effort using a razor. |
| Clear Polyester #1 | Aluminum | | Coating delaminated ½ millimeter |
| Clear Polyester #2 | Aluminum | | Coating delaminated ½ millimeter |
| Clear Polyester #4 | Aluminum | | Coating delaminated ½ millimeter |
| Clear Polyester #5 | Aluminum | | Coating delaminated ½ millimeter |
| White hybrid #2 | Aluminum | | Coating delaminated ½ millimeter |
| White hybrid #3 | Aluminum | | Coating did not delaminate |
| White hybrid #5 | Aluminum | | Coating delaminated 1 millimeter |
| White hybrid #6 | Aluminum | | Coating delaminated 1 millimeter |
| Formula 1 #1 | Aluminum | | Coating delaminated ½ millimeter |
| Formula 1 #4 | Aluminum | | Coating delaminated 1 millimeter |
| Formula 1 #5 | Aluminum | | Coating delaminated 2 millimeters |
| Formula 1 #6 | Aluminum | | Coating delaminated ½ millimeters |
| Formula 2 #3 | Aluminum | | Coating delaminated ½ millimeter |
| Formula 2 #3 | Aluminum | | Coating delaminated ½ millimeter |
| Formula 2 #5 | Aluminum | | Coating delaminated 1.5 millimeters |
| Formula 2 #8 | Aluminum | | Coating delaminated ½ millimeter |
| Formula 3 #2 | Aluminum | | Coating delaminated ½ millimeter |
| Formula 3 #3 | Aluminum | | Coating delaminated ½ millimeter |
| Formula 3 #4 | Aluminum | | Coating delaminated ½ millimeter |
| Formula 3 #7 | Aluminum | | Coating delaminated ½ millimeter |

The white hybrid coating on steel had the least delamination from the edge when probed with a razor, when compared to the other coatings on a steel surface. Most of the other coatings on steel easily peeled off the metal. Formula 2 mostly peeled off with ease, but had tiny areas of decent adhesion. It also was more brittle than Formula 1 and the clear commercial coatings. Formula 3 panel was too corroded to test for delamination. All of the coatings adhered better to the aluminum panels. Since aluminum is passivated with an oxide layer, the coatings may have more easily stuck to the surface.

Based on the evaluations obtained so far it is apparent that polyimide films can be formulated that perform as well as or superior to commercial powder coatings with respect to dry film physical properties (e.g., flexibility, pull strength, abrasion). It can be seen that BPADA based polyimide coatings fail in localized spots rather than in a broad panel wide coating failure as on panel 21 for the B-4400 based polyimide resin. These "spot" failures correspond to the pin holes and small craters present due to reduced surface wetting of the polyimide formulations. However, the bulk of the coating surfaces are clean and free from corrosion. This indicates that the polyimide coatings themselves are excellent barriers to corrosion but require complete coverage to function properly.

Example 4

A number of monoanhydrides were evaluated as polymer chain terminators with intent to limit the molecular weight of the final PAA resin. These are applicable when used in combination with PAA resins formulated with excess diamine functionality. Among these materials were maleic anhydride (MAA), succinic anhydride (SCA), and octenylsuccinic anhydride (OSC) (see FIGURES below). Many others are available to those skilled in the art. The use of MAA as a chain terminator was also found to impart a second very important property to these polyimide powder coatings. Coating brittleness was significantly reduced as the olefinic groups provided by the MAA introduced crosslinking as the coating cure takes place.

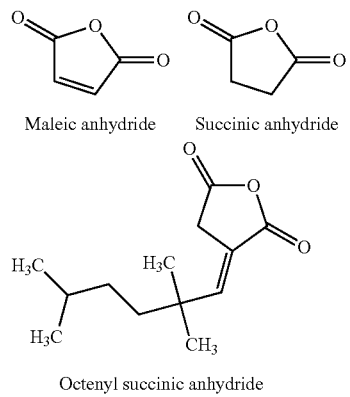

Table 11 and 12 list some of the end-capped polymers that have been prepared and their melting points and molecular weights for BPADA/DAD resin:

TABLE 11

| Item | Amine/Anhydride Ratio (m) | End Cap | mp, ° C. | GPC MW |
|---|---|---|---|---|
| 1 | 2:1 | OSC | 75 | 95,000 |
| 2 | 4:3 | OSC | 85 | 142,000 |
| 3 | 7:6 | OSC | 95 | 111,000 |
| 4 | 2:1 | MAA | 95 | 88,000 |
| 5 | 2:1* | MAA | 95 | 48,500 |
| 6 | 4:3 | MAA | 110 | — |
| 7 | 6:5 | SCA | 115 | 122,000 |

Two reaction methods were employed in the preparation of these resins. For all but item 5 the method used involved the addition of the BPADA, in one portion, to a stirring solution of the diamine in NMP solvent. Once the bulk of the reaction of these two starting materials was complete, the end-capping material was added. For item 5 both the BPADA and end-capping material were added at the same time. The resin indicated by item 5 exhibits a significantly lower molecular weight than the resins obtained by sequential anhydride addition. As can be seen, the average molecular weights obtained through sequential addition are somewhat higher but not substantially lower for these end capped resins than for those that were not end capped. However, the GPC molecular weight traces for these end-capped version are more "bimodal" than the non-endcapped resins. Most of the resins in Table 11 contain between 20 and 50% of lower molecular weight fractions. Many of these resins exhibit significant melt flow as melting points are taken. It is though that these lower molecular weight fractions help these end capped resins perform better in film evaluation.

The use of B-4400 as the dianhydride results in a polymer with no aromatic properties (Table 12). Thus melting points of the resin are significantly lower than their BPADA counterparts. In fact polymers using oxyethylene and oxypropylene containing diamines (e.g., TEGDA and TPGDA) and a shorter chained aliphatic diamines (e.g., 2-methylpentanediamine, Dytek® A) gave polymers that were isolated as sticky, taffy like liquids.

TABLE 12

B-4400/Diamine/MAA resins

| Item | Amine/Anhydride Ratio (m) | Diamine | mp, ° C. | GPC MW |
|---|---|---|---|---|
| 1 | 3:2 | DAD | 75 | |
| 2 | 5:4 | DAD | 75 | |
| 3 | 4:3 | TEGDA | liquid | |
| 4 | 4:3 | TPGDA | liquid | |
| 5 | 2:1 | Dytek A | liquid | |

The third method used to prepare resins with good melt/flow properties was accomplished by the addition of flow modifier additives. Traditional powder coating resin formulations contain a flow modifier consisting of 0.5 to 2.0% of a low molecular weight acrylate polymer. This polymer is a liquid and when added helps the resin melt and flow to a very smooth coating. This approach has also been used to attempt to generate more flow in these high melt viscosity PAA resins. Some of the materials evaluated as potential flow modifiers were:

1. Disparlon® PL-545
2. Crayvallac® MT
3. Lanco™ flow P10 (traditional polyacrylate flow modifer)
4. Igepal® CA-520 (alkylphenol ethoxylate)
5. Sorbitan monopalmitate
6. Sorbitan monooleate
7. Sorbitan monolaurate
8. Sorbitan trioleate
9. Solsperse® 20000 (ethoxylate)
10. Lubrizol® OS 84866 (alkylsuccinamide/ester)
11. Solsperse® 5000 (alkylated phthalocyanine)
12. Dibutyl phthalate
13. Various low viscosity polyimide resins and oligomers These flow modifiers were evaluated in a number of different resin formulations at concentrations ranging from 0.5 to 15%. It was noted that a number of these were very effective in reducing the melt viscosity of the resin formulation they were used in. It was also observed that some of these materials were not miscible with the bulk resin used in the formulation. Table 13 lists the surface coating results obtained when using these additives. As can be seen the Sorbitan based additives, as well as the Disparlon® and Crayvallac®, additives were effective in improving flow and minimizing craters/pin holes.

TABLE 13

| Flow Modifier | % | Surface Rating* | Comments |
|---|---|---|---|
| Lanco ™ flow P10 | 0.5-10 | 1-2 | poor solubility |
| Igepal ® CA-520 | 1-25 | 0-2 | |
| Igepal ® CA-210 | 1 | 1 | |
| Sorbitan monopalmitate | 1-20 | 2-4 | exc. >3% |
| Sorbitan monooleate | 3 | 3 | liquid |
| Sorbitan monolaurate | 3 | 3 | " |
| Sorbitan trioleate | 3 | 3 | " |
| Solsperse ® 20000 | 25 | 1 | bloom, poor adhesion |
| Solsperse ® 5000 | 1-3 | 2-3 | green, small craters |
| Lubrizol ® OS 84866 | 10 | 2 | many, but small |
| Dibutyl phthalate | 3 | 2 | " |
| Benzoin | 0.5-1 | 2 | |
| Disparlon ® PL-545 | 4 | 3.5 | minimal craters |
| Crayvallac ® MT | 3 | 3 | several craters |

*Rating scale - 0-no change; 1-some improvement; 2-good flow improvement; 3-significant improvement; 4-Excellent, no film defects.

A number of liquid polyimides and other low viscosity PAA oligomers were evaluated as potential flow modifiers as well. Table 14 lists those that were evaluated.

TABLE 14

| Item | Resin | Method Used | Comments |
|---|---|---|---|
| 1 | BPADA/DAD (1:2)m | Alone & together with #2 | Highly textured film |
| 2 | BPADA/DAD (2:1)m | Alone & together with #1 | |
| 3 | DAD/MAA (1:2)m | 20-50% in high MW resins | mp = 160 C. |
| 4 | TEGDA/MAA (1:2)m | " | mp = 145 C. |
| 5 | BPADA/DAD/MAA (1:2:2)m | " | reduction of craters |
| 6 | B-4400/DAD/MAA (2:3:2)m | " | reduction of craters |

In all cases these liquid and low melt materials appeared to improve but not solve the surface wetting issue.

Laboratory Coating Methods/Results

The following general procedure was followed in formulation preparation, application and cure. For initial formulation testing, aluminum coupons were used as the test substrate. The coupon dimensions were 5"×1" and were ~35 to 40 mils thick. Coupons were wiped with a clean towel saturated with isopropyl alcohol before use but were otherwise not altered before coating. Coating formulations were prepared by weighing the appropriate amounts of each ingredient into a small glass vial. A typical amount used was 1.00 g of total formulation. These ingredients were then manually mixed and then subjected to quick heating via a heat gun. As the contents of the vial are being heated they are manually stirred. Once the contents begin to melt, heating is slowed so as to keep the temperature of the formulation at or near the melting point of the resin. Stirring is maintained until the ingredients are well mixed (if two or more components are present) or the resin is completely melted (if just one ingredient is present). The hot formulation was then cooled quickly (water bath) and then chipped carefully from the vial. The mixture was then ground to a fine powder using a mortar and pestle. The fine powder is placed in a small sieve (typically between 140 and 200 mesh) and powder is shaken onto the aluminum coupon to cover an area about 1" in length. The coupon with loosely applied powder is then subjected to a corona field generated by the use of a Tesla coil leak detector. The loose powder layer is electrically charged by this Tesla coil field application, which matches the effect of spraying powder through a corona field in normal powder application. Care was taken not to get the tip of the Tesla coil too close to the coupon as large sparks would discharge into the applied powder. An added benefit of this charging technique is the smoothing and packing of the powder application into a very uniform layer, allowing consistent film thicknesses after cure. Once the powder has been charged the coupon is placed in a nearly vertical position in a 200° C. oven where the applied powder is melted such that coating flow and cure is affected. Typical cure time is 10 to 15 minutes.

Although the present invention has been disclosed in terms of a preferred embodiment, it will be understood that numerous additional modifications and variations could be made thereto without departing from the scope of the invention as defined by the following claims:

I claim:

1. A method for powder coating a metal substrate comprising,
    a) providing a metal substrate;
    b) powder coating directly onto said metal substrate a layer of powder resin including at least one first low-melt polyamic acid polymer, wherein said at least one first low-melt polyamic acid polymer is formed by reacting at least one low crystallinity dianhydride with at least one primary aliphatic polyamine in the presence of an end-capping material capable of providing cross-linking functionality to at least one end of the low-melt polyamic acid polymer;
        wherein said at least one low crystallinity dianhydride and said at least one primary aliphatic polyamine are provided in non-equal molar amounts such that there is more amine present than anhydride in the resulting low-melt polyamic acid polymer; and
    c) heating the layer of powder resin to a temperature to effectively melt and then cross-link the polyamic acid polymer to form a high-melt polyimide coating on the metal substrate.

2. The method of claim 1, wherein said end-capping material is maleic anhydride.

3. The method of claim 1, wherein said polyamine is 1,12-dodecanediamine.

4. The method of claim 1, wherein said powder resin includes a mixture of two polyamic acid polymers.

5. The method of claim 4, wherein said powder resin further includes at least one second low-melt polyamic acid polymer, wherein said at least one second low-melt polyamic acid polymer is formed by reacting at least one dianhydride with at least one polyamine formed without any end-capping material.

6. The method of claim 5, wherein said first low-melt polyamic acid polymer includes the compound of

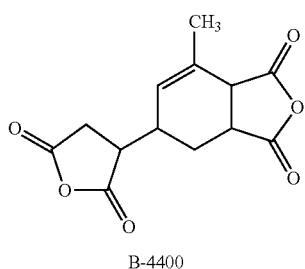

Formula A

B-4400 as the dianhydride, 1,12-dodecanediamine as the polyamine and maleic anhydride as the end-capping material and said second low-melt polyamic acid polymer includes the compound of

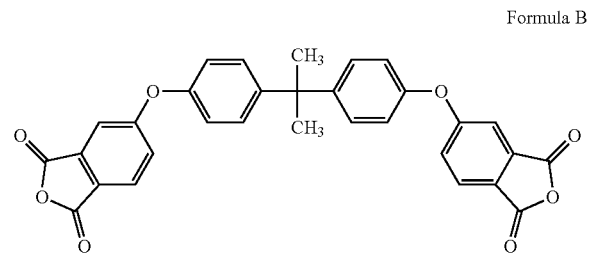

Formula B

Bisphenol A dianhydride
BPADA as the dianhydride and 1,12-dodecanediamine as the polyamine.

7. The method of claim 5, wherein said powder resin includes more than 50% by weight of the first low-melt polyamic acid polymer.

8. The method of claim 7, wherein said powder resin includes at least 80% by weight of the first low-melt polyamic acid polymer.

9. The method of claim 1, wherein said powder resin further includes a flow and leveling aid.

10. The method of claim 9, wherein said flow and leveling aid is a mixture of a low molecular weight polybutylacrylate polymer and a modified castor oil amide wax.

11. The method of claim 1, wherein said powder resin further comprises 5-10% by weight of an epoxy powder coating resin as an additive.

12. The method of claim 1, wherein the first low-melt polyamic acid polymer includes only low crystallinity dianhydrides and only primary aliphatic polyamines.

13. The method of claim 1, wherein the first low-melt polyamic acid polymer does not include any siloxane or polyether chemistry.

14. The method of claim 1, wherein said end-capping material is capable of providing cross-linking functionality to at least two ends of the low-melt polyamic acid polymer.

* * * * *